2,782,201
CYCLIC ACETALS OF PYRIDINE(3) ALDEHYDE

Floyd E. Anderson, Yonkers, N. Y., assignor to Nepera Chemical Co., Inc., Yonkers, N. Y., a corporation of New York No Drawing. Application February 23, 1956, Serial No. 567,058

15 Claims. (Cl. 260—297)

This invention relates to novel heterocyclic compounds and relates more particularly to certain new and novel cyclic acetals of 3-pyridine aldehyde of the following general formula:

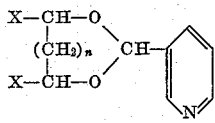

wherein $n$ may be zero, one or two and X may be hydrogen, an alkyl group or a hydroxyalkyl group, and to their salts.

An object of my invention is the provision of novel cyclic acetals of 3-pyridine aldehyde which are non-toxic, or substantially so and which, when applied topically, are highly useful as hyperemic agents.

Another object of this invention is the provision of novel acetals of 3-pyridine aldehyde which may be obtained by convenient synthetic processes utilizing 3-pyridine aldehyde and a polyhydroxy alkyl compound as intermediates.

A further object of this invention is the production of cyclic acetals of 3-pyridine aldehyde whose hyperemic action is rapid, pronounced and extended in duration.

Other objects of this invention will appear from the following detailed description.

Certain esters of 3-pyridine carboxylic acid, when applied topically, have been observed to produce a hyperemia, or local reddening of the skin area. This local action is very apparent in some cases. However, the esters have been observed to differ markedly in the rapidity of their action as well as in the extent and duration of the hyperemia produced. The preferred topical agents are those which exhibit each of these desirable characteristics in a proper ratio since it has been observed that a hyperemia of rapid onset may be mild or of very short duration. In other instances, the opposite may be noted, again limiting the usefulness of the compound.

I have now found that the cyclic acetals of 3-pyridine aldehyde of the formula:

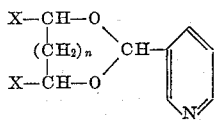

wherein $n$ is zero, one or two, and X is hydrogen, an alkyl group or a hydroxyalkyl group are topically-active hyperemic agents having a very desirable degree of uniformity in their action and, surprisingly enough, have been found to combine the attributes of rapid onset with pronounced and prolonged activity.

In forming the novel 3-pyridine aldehyde acetals of my invention, 3-pyridine aldehyde is reacted under reflux in a suitable inert solvent medium with a polyhydroxyalkyl compound containing at least two hydroxy groups. Examples of polyhydroxy alkyl compounds which are suitable are ethylene glycol, 1,2-propylene glycol, 1,3-propylene glycol, 1,2-butylene glycol, 1,3-butylene glycol, 2,3-butylene glycol, 2,3-hexandiol, glycerine and 2,4-amylene glycol. To catalyze the reaction a small amount of an acid catalyst such as concentrated aqueous hydrochloric acid, p-toluene sulfonic acid, phosphoric acid, or sulfuric acid may be added, or hydrogen chloride may be bubbled through while refluxing the reactants. In certain instances it has been found satisfactory to employ as catalyst the acid form of a cation exchange resin of the sulfonic acid type such as Amberlite IR–120 (Rohm and Haas Co.). The acetal formed is conveniently separated by fractional distillation of the reaction mixture under reduced pressure. When benzene or other reaction solvent forming an azeotrope with water is employed, the water of reaction is conveniently removed by condensing the solvent-water azeotrope and separating the phases, the aqueous phase being discarded and the solvent phase returned to the reaction vessel.

Since the novel acetals of my invention are basic compounds, they form salts with acids such as hydrochloric acid, oxalic acid, citric acid, tartaric acid, phosphoric acid, sulfuric acid, mandelic acid, beta-resorcylic acid or para-toluene sulfonic acid and also form quaternaries with alkyl halides such as an alkyl chloride, alkyl bromide or alkyl iodide in which the alkyl group contains up to ten carbon atoms. Examples of said alkyl halides which may be employed to form quaternaries with my novel acetals are methyl iodide, methyl chloride, ethyl iodide, propyl iodide, hexyl bromide and decyl bromide. The quaternaries may readily be formed by reacting the particular alkyl halide with the desired acetal in anhydrous ether at reflux temperature. Other anhydrous solvents such as toluene, xylenes, diisopropyl ether or dioxane are suitable and the reaction temperature may be from 30° to 130° C. In this temperature range, the quaternization reaction is complete in from 2 to 48 hours.

In order further to illustrate my invention but without being limited thereto, the following examples are given:

Example I 10.7 parts by weight of 3-pyridine aldehyde and 6.2 parts by weight of ethylene glycol are added to 400 parts by weight of benzene and about 2 parts by weight of concentrated hydrochloric acid are added. The mixture is then refluxed and the benzene-water azeotrope which distills over is condensed and separated, the water being discharged and the benzene returned to the reaction mixture. When no more water distills over, the mixture is cooled in a bath of ice and water and an excess of 10% by weight aqueous sodium hydroxide is added. The benzene layer is removed and the aqueous layer extracted about three times with diethyl ether. The ether and benzene layers are combined and distilled to remove the solvents and the residue which remains is fractionated. About 10 parts by weight of 2-(3-pyridyl)-1,3-dioxolane are obtained boiling at 95–97° C. at 3.0 mm. mercury pressure. The dioxolane has a refractive index $n_D^{20}$ of 1.5257. This compound also forms a crystalline oxalate having a melting point of 104–105° C. Nitrogen analysis for the oxalate $C_8H_9NO_2 \cdot C_2H_2O_4$ is: Calculated— 5.81%, found—5.88%.

The methiodide of 2-(3-pyridyl)-1,3-dioxolane is obtained by reacting the latter with methyl iodide in anhydrous ether and separating the quaternary salt which forms. On recrystallization from a mixture of ethyl alcohol and diisopropyl ether, the salt obtained melts at 180.5° C. Analysis for C₉H₁₂NO₂I is:

|  | Percent I |
|---|---|
| Calculated | 43.3 |
| Found | 44.0 |

*Example II*

17.2 parts by weight of glycerol and 20 parts by weight of 3-pyridine aldehyde are refluxed in about 200 parts by weight of dry benzene containing 5 parts by weight of the acid form of a cation exchange resin of the sulfonic acid type (e. g. Amberlite IR–120, Rohm & Haas) and the water formed is distilled over as a water-benzene azeotrope. Reflux is continued until about 3.9 parts by weight of the water-containing layer are removed. The resin is filtered off and the solution remaining is fractionated and 9.8 parts by weight of 2-(3-pyridyl)-4-hydroxymethyl-1,3-dioxolane are obtained boiling at 158–159° C. under 2.5 mm. pressure and having a refractive index $n_D^{25}$ of 1.5368. Nitrogen analysis for C₉H₁₁NO₃ is:

|  | Percent N |
|---|---|
| Calculated | 7.73 |
| Found | 7.57 |

*Example III*

12 parts by weight of 1,3-propanediol and 15 parts by weight of 3-pyridine aldehyde are added to 200 parts by weight of benzene and 2 parts by weight of concentrated hydrochloric acid are added. The mixture is refluxed until 4 parts by weight of the water-containing layer are separated with the water-benzene azeotrope which distills over. The aqueous distillate is extracted with ether, the ether added to the benzene phase and the combined solvents washed with a small amount of 10% aqueous sodium hydroxide and dried over anhydrous sodium carbonate. The dry solvent solution is fractionated and 8.5 parts by weight of 2-(3-pyridyl)-1,3-dioxane obtained boiling at 120–123° C. at 3 mm. pressure. The refractive index $n_D^{25}$ is 1.5208. Nitrogen anlysis for C₉H₁₁NO₂ is:

|  | Percent N |
|---|---|
| Calculated | 8.48 |
| Found | 8.30 |

The oxalate of 2-(3-pyridyl)-1,3-dioxane is a crystalline compound melting at 129° C.

The foregoing reaction is readily carried out with other glycols. By reacting 2,3-butylene glycol with 3-pyridyl aldehyde in benzene in the manner described in the foregoing examples, 2-(3-pyridyl)-4,5-dimethyl-1,3-dioxolane is obtained. When 1,3-butylene glycol is substituted, for example, 2-(3-pyridyl)-4-methyl-1,3-dioxane is obtained.

It is understood that the foregoing detailed description is given merely by way of illustration and that many variations may be made therein without departing from the spirit of my invention.

Having described my invention, what I desire to secure by Letters Patent is:

1. Compounds of the group consisting of dioxolanes of the formula

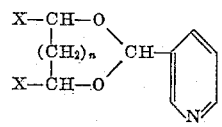

wherein $n$ is selected from the group consisting of zero, one and two and X is a member of the group consisting of hydrogen, alkyl and hydroxyalkyl radicals containing 1 to 6 carbon atoms, their salts and their quaternaries.

2. The compound 2-(3-pyridyl)-1,3-dioxolane.
3. The compound 2-(3-pyridyl)-4-hydroxymethyl-1,3-dioxolane.
4. The compound 2-(3-pyridyl)-1,3-dioxane.
5. The compound 2-(3-pyridyl)-4,5-dimethyl-1,3-dioxolane.
6. The compound 2-(3-pyridyl)-4-methyl-1,3-dioxane.
7. Process for the production of acetal compounds, which comprises reacting 3-pyridine aldehyde with a polyhydroxy alkyl compound of the formula

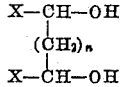

wherein $n$ is selected from the group consisting of zero, one and two and X is a member of the group consisting of hydrogen, alkyl and hydroxyalkyl radicals containing 1 to 6 carbon atoms.

8. Process for the production of acetal compounds, which comprises reacting 3-pyridine aldehyde with a polyhydroxy alkyl compound of the formula

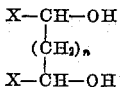

wherein $n$ is selected from the group consisting of zero, one and two and X is a member of the group consisting of hydrogen, alkyl and hydroxyalkyl radicals containing 1 to 6 carbon atoms, said reaction being carried out in an acidified, inert solvent medium.

9. Process for the production of acetal compounds, which comprises reacting 3-pyridine aldehyde with a polyhydroxy alkyl compound of the formula

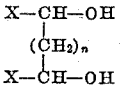

wherein $n$ is selected from the group consisting of zero, one and two and X is a member of the group consisting of hydrogen, alkyl and hydroxyalkyl radicals containing 1 to 6 carbon atoms, said reaction being carried out in an acidified, inert solvent medium and separating the water formed as an azeotrope with the solvent medium.

10. Process which comprises reacting 3-pyridine aldehyde with ethylene glycol to form 2-(3-pyridyl)-1,3-dioxolane.

11. Process which comprises reacting 3-pyridine aldehyde with glycerol to form 2-(3-pyridyl)-4-hydroxymethyl-1,3-dioxolane.

12. Process which comprises reacting 3-pyridine aldehyde with 1,3-propanediol to form 2-(3-pyridyl)-1,3-dioxane.

13. Process which comprises reacting 3-pyridine aldehyde with 2,3-butylene glycol to form 2-(3-pyridyl)-4,5-dimethyl-1,3-dioxolane.

14. Process which comprises reacting 3-pyridine aldehyde with 1,3-butylene glycol to form 2-(3-pyridyl)-4-methyl-1,3-dioxane.

15. Process in accordance with claim 7 wherein the acetal is further reacted with an alkyl halide wherein the alkyl group contains not more than ten carbon atoms.

No references cited.